(12) United States Patent
Taylor et al.

(10) Patent No.: US 8,307,199 B2
(45) Date of Patent: Nov. 6, 2012

(54) CONFIGURABLE ACCESS KERNEL

(75) Inventors: Kevin Norman Taylor, Parker, CO (US); James Fahrny, Parker, CO (US); William Lynn Helms, Longmont, CO (US); Azita Miahnahri Manson, Mountain View, CA (US); Andrew T. Twigger, Reading (GB); Nancy Louise Davoust, Louisville, CO (US); Henry Clarence Lilly, III, Bristol, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 0 days.

(21) Appl. No.: 13/040,353

(22) Filed: Mar. 4, 2011

(65) Prior Publication Data

US 2011/0191572 A1 Aug. 4, 2011

Related U.S. Application Data

(63) Continuation of application No. 11/855,735, filed on Sep. 14, 2007, now Pat. No. 7,934,083.

(51) Int. Cl.
*G06F 9/24* (2006.01)
*G06F 15/177* (2006.01)
*G06F 12/14* (2006.01)
(52) U.S. Cl. ............... 713/1; 713/2; 713/191; 713/192; 705/901; 348/725; 380/203
(58) Field of Classification Search ............ 713/1, 2, 713/191, 192; 705/901; 348/725; 380/203
See application file for complete search history.

(56) References Cited

U.S. PATENT DOCUMENTS

| | | | |
|---|---|---|---|
| 4,792,973 A | 12/1988 | Gilhousen et al. |
| 4,860,353 A | 8/1989 | Brown |
| 5,054,067 A | 10/1991 | Moroney et al. |
| 5,671,276 A | 9/1997 | Eyer et al. |
| 5,734,720 A | 3/1998 | Salganicoff |
| 5,784,095 A | 7/1998 | Robbins et al. |
| 5,982,363 A | 11/1999 | Naiff |
| 6,157,719 A | 12/2000 | Wasilewski et al. |
| 6,271,837 B1 | 8/2001 | Naiff |
| 6,424,717 B1 | 7/2002 | Pinder et al. |
| 6,748,080 B2 | 6/2004 | Russ et al. |
| 6,898,285 B1 | 5/2005 | Hutchings et al. |

(Continued)

FOREIGN PATENT DOCUMENTS
WO 03043310 5/2003

OTHER PUBLICATIONS

Jim Lyle. "HDCP: what it is and how to use it" Originally Published Apr. 18, 2002 pp. 1-5, and Figures 1-6. http://www.edn.comlindex. asp?layout=articlePrint&articleID=CA209091.

(Continued)

*Primary Examiner* — Vincent Tran
(74) *Attorney, Agent, or Firm* — Banner & Witcoff, Ltd.

(57) ABSTRACT

A highly configurable kernel supports a wide variety of content protection systems. The kernel may reside in a host that interacts with a secure processor maintaining content protection clients. After establishing communication with the secure processor, the host receives messages from content protection clients requesting rules for message handling operations to support client operations. This flexible configuration allows for dynamic reconfiguration of host and secure processor operation.

20 Claims, 7 Drawing Sheets

U.S. PATENT DOCUMENTS

| | | |
|---|---|---|
| 6,976,163 B1 | 12/2005 | Hind et al. |
| 7,069,452 B1 | 6/2006 | Hind et al. |
| 7,703,141 B2 * | 4/2010 | Alkove et al. .................... 726/26 |
| 7,934,083 B2 * | 4/2011 | Taylor et al. ....................... 713/1 |
| 2001/0046299 A1 | 11/2001 | Wasilewski et al. |
| 2002/0090090 A1 | 7/2002 | Van Rijnsoever et al. |
| 2002/0101990 A1 | 8/2002 | Morino et al. |
| 2002/0118837 A1 | 8/2002 | Hamilton |
| 2002/0136406 A1 | 9/2002 | Fitzhardinge et al. |
| 2002/0170054 A1 | 11/2002 | Kudelski et al. |
| 2003/0002577 A1 | 1/2003 | Pinder |
| 2003/0097655 A1 | 5/2003 | Novak |
| 2003/0123667 A1 | 7/2003 | Weber et al. |
| 2003/0190044 A1 | 10/2003 | Higashi et al. |
| 2003/0219127 A1 | 11/2003 | Russ et al. |
| 2003/0226029 A1 | 12/2003 | Porter et al. |
| 2004/0057579 A1 | 3/2004 | Fahrny |
| 2004/0098591 A1 | 5/2004 | Fahrny |
| 2004/0177369 A1 | 9/2004 | Akins, III |
| 2004/0208316 A1 | 10/2004 | Wack et al. |
| 2005/0010778 A1 | 1/2005 | Walmsley |
| 2005/0100161 A1 | 5/2005 | Husemann et al. |
| 2005/0119967 A1 | 6/2005 | Ishiguro et al. |
| 2005/0169468 A1 | 8/2005 | Fahnry et al. |
| 2005/0204163 A1 | 9/2005 | Alkove et al. |
| 2005/0228752 A1 * | 10/2005 | Konetski et al. ................ 705/51 |
| 2006/0031873 A1 | 2/2006 | Fahrny et al. |
| 2006/0122946 A1 | 6/2006 | Fahrny et al. |
| 2006/0137015 A1 | 6/2006 | Fahrny et al. |
| 2006/0153379 A1 | 7/2006 | Candelore et al. |
| 2006/0184796 A1 | 8/2006 | Fahrny |
| 2006/0200412 A1 | 9/2006 | Fahrny et al. |
| 2007/0139557 A1 | 6/2007 | Arad |
| 2008/0059648 A1 | 3/2008 | Manges |
| 2008/0086757 A1 | 4/2008 | Pestoni |
| 2008/0095366 A1 | 4/2008 | Taniguchi |
| 2008/0168266 A1 * | 7/2008 | Sita et al. ......................... 713/2 |
| 2008/0266464 A1 * | 10/2008 | Chen ............................. 348/728 |
| 2008/0294890 A1 * | 11/2008 | Lee et al. ...................... 713/153 |
| 2008/0313463 A1 | 12/2008 | Depietro et al. |

OTHER PUBLICATIONS

FCC News: Commission Adopts "Navigation Devices" Rules Creating Consumer Market for Set Top Boxes and Other Equipment Used with Video Programming Systems (CS Docket 97-80). Originally Published Jun. 11, 1998 pp. 1-3 http://w.fcc.gov/BureauslCableNews~Releases/1998/nrcb8013.html.

"Explorer 4200HD Home Gateway" c2002 Scientific Atlanta Inc. http:llwww.sciati.comlproductslconsumers/userguidepdfs/4001344.pdf.

\* cited by examiner

CONFIGURABLE ACCESS KERNEL

CROSS-REFERENCE TO RELATED APPLICATIONS

This application is a continuation of U.S. patent application Ser. No. 11/855,735, filed on Sep. 14, 2007, by Kevin Norman Taylor, James Fahrny; William Lynn Helms, Azita Miahnahri Manson, Andrew T. Twigger, Nancy Louise Davoust, and Henry Clarence Lilly, III, and entitled "Configurable Access Kernel."

BACKGROUND OF THE INVENTION

1. Field of the Invention

The present invention relates to configuring content protection systems.

2. Background Art

A content protection system, such as a conditional access system (CAS), determines whether or not access will be granted to a stream of information. An exemplary application of CAS is in set-top boxes used to decrypt and decode audio and video information transmitted over a cable plant or other network. Typically, these set-top boxes provide additional functionality, some of which supports CAS operations and some of which is unrelated to CAS. In addition to CAS, set-top boxes may also include other content protection systems, including digital rights management (DRM), authorized service domain (ASD), and the like. Not only are there different types of content protection, but different manufacturers often have different requirements for each type.

In order to increase the flexibility of set-top boxes and other media support devices, downloadable CAS (DCAS) systems have been developed. These systems allow various content protection support functionality to be downloaded over the network to the set-top box. However, each different version or upgrade requires downloading different software to support that particular version. Such downloads over broadcast systems, such as typical cable systems, can take considerable time and resources as different components are loaded into various customer devices.

Recently, regulations in the United States have mandated separating user devices, such as set-top boxes, video recorders, personal computers, televisions, and the like, and security protecting content provided to such devices. This separation has been achieved using CableCARDs which insert into a slot in a user device to provide content protection functionality. However, these CableCARDs lack flexibility, are prone to mechanical problems, cause confusion with users, and create inventory and compatibility difficulties.

What is needed is to provide separable security that is flexible and transparent to the user without significantly increasing the complexity or cost of user devices.

SUMMARY OF THE INVENTION

The present invention provides for a common, highly configurable kernel supporting a wide variety of content protection systems.

In one embodiment, a dynamically configurable system provides protection of content streams. The system includes a secure processor maintaining a plurality of content protection clients and a host supporting a configurable kernel. The kernel sends a request to the secure processor. At least one content protection client maintained by the secure processor is identified based on a response to the request. At least one parameter group request is received from an identified content protection client. Message handling for the identified client is configured in response to the receipt of at least one parameter group request.

Message handling includes a wide variety of host functionality. For example, the parameter group request may specify filtering parameters for selectively filtering messages received by the host. The selective filtering may be used to specify into which queue messages received by the host will be placed, determine how to handle duplicate messages, describe message parsing, and the like.

The host may implement a hierarchical message queue system with a high priority queue for at least one content protection client, at least one lower priority queue for each of a plurality of content protection clients, and a status queue for each content protection client. The host may use a modified round robin scheduling algorithm for lower priority queues with status queues considered members of the set of queues at each lower priority level.

A method for operating customer premises equipment having a secure processor is also provided. A request is sent to the secure processor. In response to this request information identifying each of the content protection clients is received. A message is sent to each of the identified content protection clients. Message handling instructions are received from at least one of the identified content protection clients. Message handling operations are then configured including parameters for selectively filtering received messages for that content protection client.

Various software elements may be downloadable. For example, code implementing at least one content protection client may be downloaded. The code may be segmented and transmitted to the secure processor. A request is then sent to the secure processor requesting information about the content protection client implemented by the downloaded code, initiating dynamic reconfiguration for the downloaded client.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
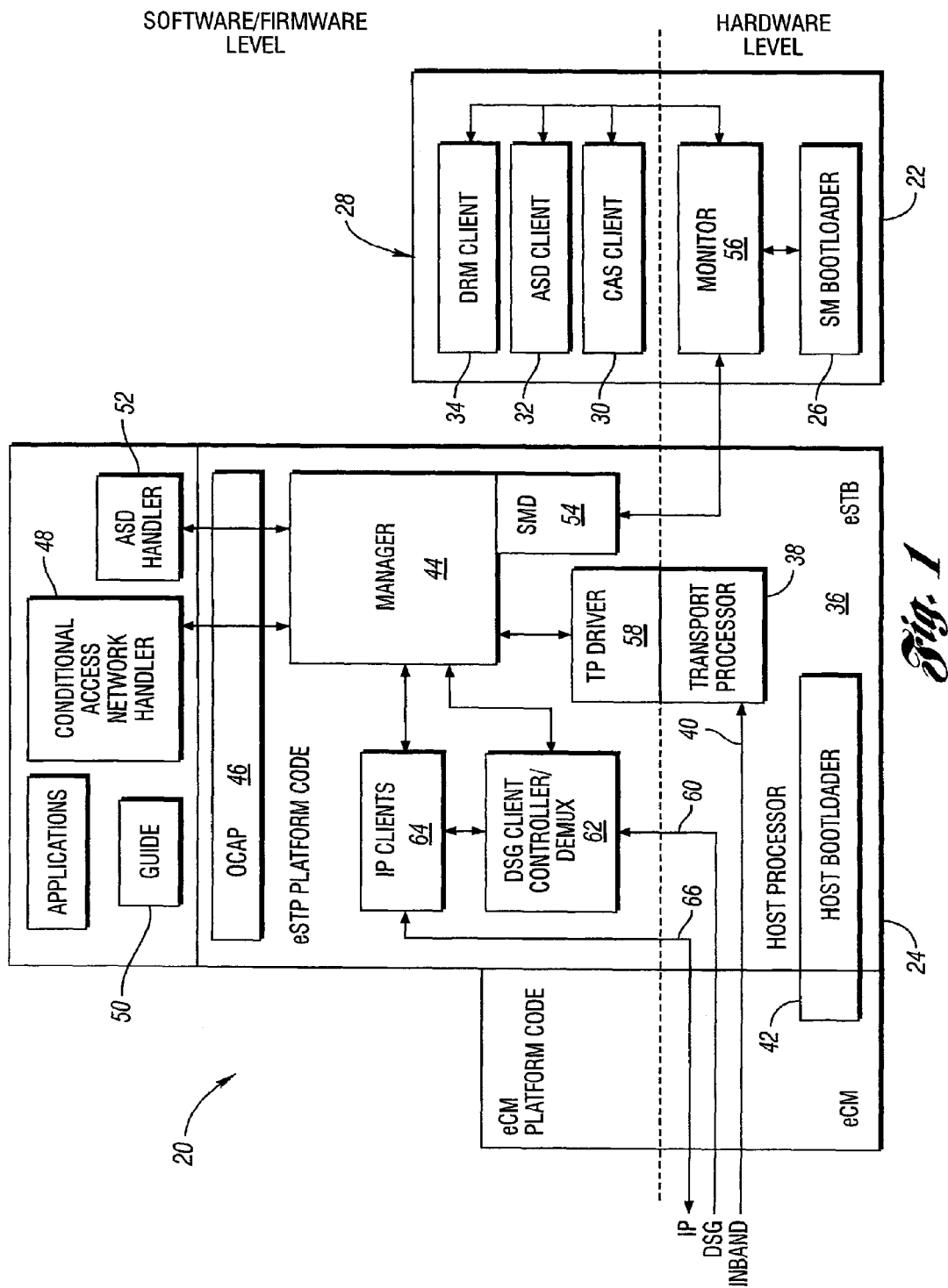
FIG. 1 is a block diagram of a content protection system according to an embodiment of the present invention.

Referring to FIG. 1, a block diagram of a content protection system according to an embodiment of the present invention is shown. A content protection system, shown generally by 20, includes a protected computer 22 which, in this example, is a secure microprocessor (SM), and a host 24. SM 22 may include hardware and firmware to support downloading of any content protection or conditional access system. SM 22 may provide the cryptographic primitives and security technology to support multiple types of content protection systems. Bootloader 26 on SM 22 provides a secure operating and routing environment for downloaded SM clients, shown generally by 28, onto SM 22. SM clients may include, for example, Conditional Access System (CAS) client 30, Authorized Service Domain (ASD) client 32, Digital Right Managements (DRM) client 34, and the like. SM 22 provides key management services to enable decryption of multiple video streams under direction of installed client(s) 28.

Host 24 includes one or more computers, referenced here as host processor 36. Host processor 36 may include transport processor (TP) 38 for encrypting and decrypting inband information streams 40 such as video and media protected by SM clients 28. Transport processor 38 may also filter messages from inband streams 40. Host processor 36 may also include host bootloader 42 for initiating host functions. Host 24 supports and manages the flow of messages throughout system 20 such as Conditional Access (CA) and other client messages including entitlements, System Information (SI) messages, Electronic Program Guide (EPG) messages, Emergency Alert System (EAS) messages, system data and time messages, application specific messaging to and from the head-end and multiple system operator (MSO) back office, device provisioning and configuration messages, code download messages, and the like.

Some or all of content protection system 20 may be downloadable to host processor 36. Such a downloadable content protection system may be referred to as a downloadable content access system (DCAS), even if multiple types of clients 28 are supported. In this case, content protection system 20 may be said to include DCAS host 24. In the embodiment shown, DCAS host 24 implements an embedded set-top box entity (eSTB) having an embedded cable modem entity (eCM). As will be recognized by one of ordinary skill in the art, other types of hosts 24 in various kinds of devices fall within the spirit and scope of the present invention.

Host 24 includes manager (e.g., DCAS manager) 44. Manager 44 includes functionality for managing resources on behalf of SM 22. This functionality is typically provided in the form of software or firmware downloaded on host processor 36. Management functions include, for example, communications, routing, queuing, processing, filtering, and parsing messages. Manager 44 supports higher level applications through OpenCable Application Platform (OCAP) 46, as is known in the art. For example, Conditional Access Network Handler 48 is an OCAP application that uses various messages from the conditional access head-end in the MSO network for various CAS related services such as pay-per-view purchases and host-related functions such as configuration for resets of host 24. Other applications include programming guide 50, ASD Handler 52, and the like.

Secure microprocessor driver (SMD) 54 transfers messages and information between the manager 44 and monitor 56 in SM 22 using a defined consistent mechanism SMD 54 supports the physical layer requirements as well as the transfer of the information over the available physical layer format. Transport processor driver (TP driver) 58 transfers messages between manager 44 and the transport processor 38. DOCSIS set-top gateway (DSG) messages from out-of-band DSG streams 60 are received and forwarded by DSG client controller/demultiplexer 62. Out-of-band Internet Protocol (IP) messages may be sent from or received by one or more IP clients 64 over various IP channels 66.

During operation, host 24 may download one or more compliant SM client(s) 28 for allowing upgrading and changing of CAS, ASD, DRM, other content protection systems, and security for other services. Additionally, the present invention provides common mechanisms regardless of which content protection system is loaded, such as communication, routing, scheduling, queuing, filtering, message processing, defined common messages, driver technology for SM 22, managed device initialization, extensions to managed host code, device reset technology, and the like.

Host functionality supporting configuration and communication may constitute a kernel or verifier. This functionality, at least a portion of which may reside in manager 44, may provide a proprietary set of features to handle system information, messages, code download, device provisioning, device management, scheduling of messages within host 24, messaging with the conditional access system in the MSO head-end, and the like. These functions typically do not directly implement content protection. Providing a common, flexible, reconfigurable platform to handle these and other functions is part of the innovation of the present invention.

As will be described in greater detail below, the present invention provides a tool box for each conditional access/content protection system that may be configured as needed to support the provided features. Some have become MSO system common features, such as code download, device provisioning, device management, system information, and the like. The present invention provides the flexible environment for the conditional access/content protection system to continue to provide the security services for content, but is no longer needed to support the other features.

The present invention fully supports the Downloadable Conditional Access System (DCAS) effort defining a security architecture to deliver software clients for the protection of advanced video systems and emerging media technologies delivered to a set-top box (STB), set-top device (STD), and other compliant customer premise equipment (CPE) including mobile or portable devices. DCAS Hosts are intended to support encryption and decryption of content protected by different types of legacy Condition Access Systems (CAS), the DVB-CSA CAS proprietary systems, Digital Rights Management (DRM) for content, Authorized Service Domain (ASD) for content, and the like. The present invention also supports new content protection systems as well as other services requiring security protection.

Figure 2:
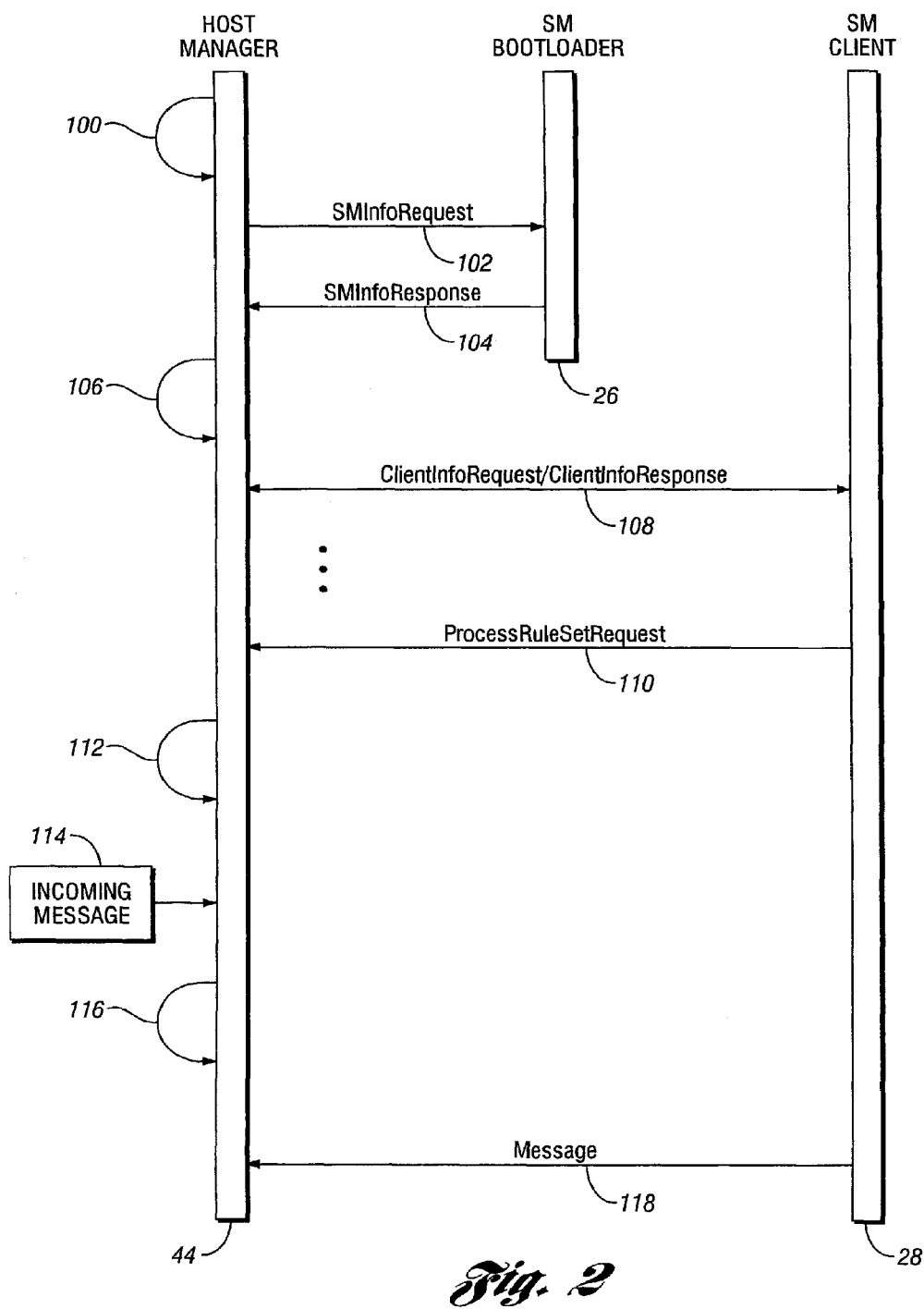
FIG. 2 is a schematic diagram illustrating messaging and function operation according to an embodiment of the present invention.

Referring now to FIG. 2, a schematic diagram illustrating messaging and function operation according to an embodiment of the present invention is shown. One possible sequence of message flows and manager functions for dynamic configuration during initialization and subsequent message handling is provided. As will be appreciated by one of ordinary skill in the art, the operations illustrated are not necessarily sequential operations. The order of steps may be modified within the spirit and scope of the present invention and the order shown here is for logical presentation. Also, the operations illustrated may be implemented by any combination of hardware, software, firmware, and the like, by one processor or distributed. The present invention transcends any particular implementation and the embodiments are shown in this form for ease of illustration.

Manager 44 can be configured at any time by SM 22 for various connections and messages. In one embodiment, SM 22 identifies for host 24 the needed resources and the messages expected from various transport paths. A processing parameter group, such as a rule set, provides a common mechanism for SM bootloader 26 and/or SM client(s) 28 to configure manager 44 and other components within the host 24 to handle messages for SM 22. The processing parameter group may include descriptions for a series of filters, parsers and actions to be performed depending upon the state of the current content stream and the current step within the filtering process. This allows content protection systems to toggle between actions depending upon the current state of a content stream.

Manager 44 may perform an initialization process based on a particular system state or action, such as after a first-time power-up, code download, reset, crash/error recovery, or the like. Manager 44 sets up queues for SM bootloader 26, as in operation 100. Manager 44 generates an SMInfoRequest message asking for current status of the secure processor and forwards the message to SM bootloader 26, as in operation 102. Bootloader 26 responds with SMInfoResponse indicating that one or more SM clients are loaded, as in operation 104. Manager 44 sets up queues for the specified SM clients, as in operation 106. Information for the types of these queues may be known by manager 44 or may be provided by messages to manager 44. Various ClientInfoRequest and ClientInfoResponse messages may be passed between manager 44 and identified client(s) 28, as in operations 108.

As part of initialization, or as needed by a client 28, client 28 may send a ProcessingRuleSetRequest message containing a processing parameter group, as in operation 110. This message may provide one or more of a variety of rules to be implemented by manager 44 for servicing client 28. One or more queues may be flushed. A queue identifier may be assigned or changed. Instructions for handling queue treatment on channel change may be specified. Filter rules, parser rules, check sum handling, duplicate message handling, rule state, and the like, may be specified. Manager 44 performs the specified filter, state, and parser set-up, queue operations, and other specified operation, as in operation 112.

Message 114 is received by manager 44 from a host module such as, for example, transport driver 58, DSG client 62 controller, IP client 64, handlers 48, 52, and the like. Manager 44 performs the specified operations on message 114, such as applying message matching rules, checking for duplicate messages, applying check sum rules, switching to additional rules, performing state checks, parsing the message, queuing the message, and/or discarding the message, as in operation 116. If appropriate conditions are met and the message is at the head of a queue, the message is sent to the appropriate client, as in operation 118.

Figure 3:
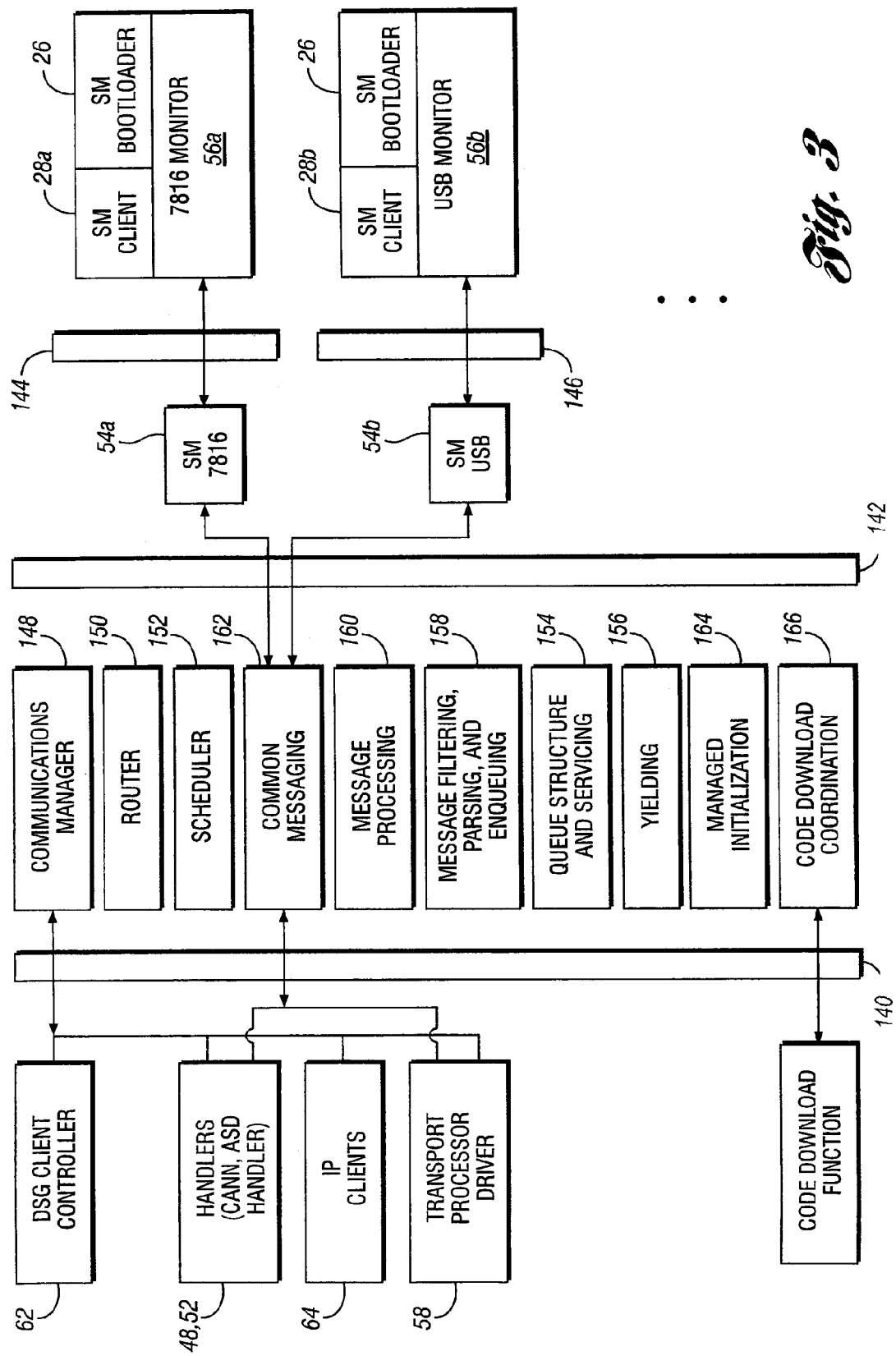
FIG. 3 is a schematic diagram illustrating software interactions according to an embodiment of the present invention.

Referring now to FIG. 3, a schematic diagram illustrating software interactions according to an embodiment of the present invention is shown. Manager 44 may be conceptualized as having a plurality of functional modules. These modules cooperate to provide configurable, flexible, content protection tools including one or more of communication manager, router, scheduler, queuing techniques and models, yielding, message filtering, message processing, defined common messaging, managed device utilization, extensions coordinating code download, and the like.

Messages flow between manager 44 and host modules across host module interface 140. Messages flow between manager 44 and secure processor 22 across manager/SMD interface 142. The present invention may support one or more SM communication types. In the embodiment shown, SM driver 54a supports an ISO 7816 channel and SM driver 54b supports a USB channel SM driver 54a exchanges messages across 7816 interface with 7816 monitor 56a in SM 22. Similarly, SM driver 54b exchanges messages across USB interface 146 with USB monitor 56b in SM 22. Monitors 56a, 56b relay messages between SM bootloader 26 and one or more SM clients 28, shown here as clients 28a and 28b. As will be recognized by one of ordinary skill in the art, other communication formats may be used within the spirit and scope of the present invention.

Manager 44 may include a communication manager to provide connection management. Manager 44 uses the concept of connection to identify and establish a data unit flow from a connection source to secure processor 22. Supported connection types can include inband, IP, multicast, Secure Application Service (SAS), Data Store, and DSG. Manager 44 sets up and tears down connections with the various types of communications technologies available to communicate outside of the host 24. Each connection is specifically managed by SM 22 with manager 44 configured as a proxy to SM 22. Manager 44 may report status to SM 22 so that communications on any given connection can begin or terminate.

Manager 44 may use Connection Type and Connection Identifier to identify a connection flow to and from SM 22. Each connection uses a Connection Identifier to uniquely label each flow such that data can be correlated on that flow. For example, SM Bootloader 26 needs two IP connections, SM Bootloader 26 requests two Connection Identifiers from manager 44 of IP connection type. SM Bootloader 26 then provides manager 44 the necessary information to make each IP connection, such as IP address, port number, and the like. Once a connection has been identified, SM 22 can then, if needed, request a processing parameter group, which includes filter definitions, processing rule management controls, parser rules, duplicate detection, enqueue rules and other rules for a requested connection. In one embodiment, SM 22 is not permitted to request a processing parameter group on a SAS or a Data Store connection.

Once connections are established, the state of the connection can change. For example, an IP connection can move from the bound state to a terminated state if the IP transport layer is no longer available. For the defined types of connection state changes, rules may be established concerning communicating the connection state to SM 22 and, if warranted, re-establishment rules can be enabled, depending upon the connection type.

Through manager 44, handlers 48, 52 are also able to request Multicast, IP, and DSG connection types, as well as consume data from established Inband, ASD or DRM connections. Handlers 48, 52 are permitted to request IP connections and SAS connections through defined OCAP APIs, as is known in the art. In one embodiment, handlers 48, 52 are not permitted to request data store connection types to preserve security.

Manager 44 may include router 150 which can function as a messaging router between SM 22 and other modules inside host 24 as well as outside host 24. Routing messages combine with other manager features such as, for example, scheduler and queuing mechanisms, to provide a powerful yet flexible system for controlling high priority services while continuing to service lower priority services within a specified algorithm.

Routing service 150 may use a set of producer and consumer codes assigned to various components such as, for example, SM bootloader 26, SM client(s) 28, TP driver 58, manager 44, handlers 48, 52, and the like. Manager 44 may send and receive information from other host modules as defined by each host vendor implementation using these codes. Routing message paths may pertain to messages destined to and from SM 22 and/or messages destined to and from handlers 48, 52. Each message path may be governed by a connection plus a generic message to send and receive opaque data, may use a defined DCAS common message for specific tasks, or the like.

Scheduler 152 may dynamically adjust the scheduling mechanism based on logic for processing. A forward message priority path may be assigned by SM 22 and organized within the queuing structure and may include a priority on the reverse message path. For example, responses to SM 22 messages may be handled either immediately (synchronously) or may be handled after all other synchronous operations have been performed (asynchronously). The fabric scheduler 152 is woven between requirements such as providing the next message to SM 22 and processing of the returned messages from SM 22. Scheduler 152 may be configurable on the forward path for messages SM 22 received from the various types of connections. Other messages may be statically assigned within the priority hierarchy as a lower priority. The statically assigned messages may be scheduled at a priority based on the overall task for either host initialization or normal operations such as decrypting content.

Manager 44 may also include queue structure and servicing functionality 154. Each message destined for SM 22 is placed in an assigned queue. The queue setup, usage, and message assignment can be configured on the fly to create the queuing environment needed by SM 22 at any given time. The selection algorithm for dequeuing messages may be adjusted based on a request from SM 22 to accommodate message handling for known content protection systems as well as for future use.

Figure 4:
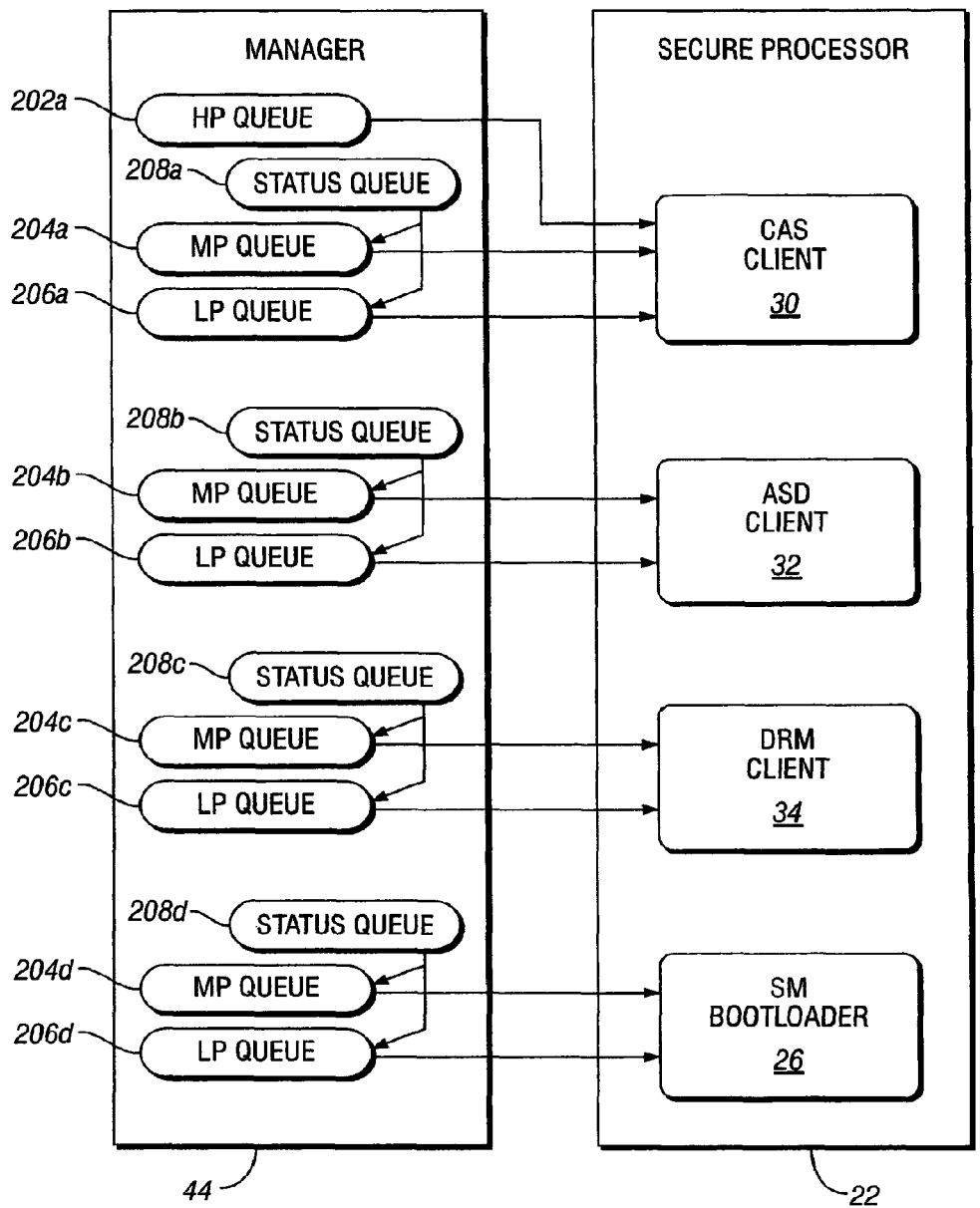
FIG. 4 is a schematic diagram illustrating queue structure according to an embodiment of the present invention.

Referring now as well to FIG. 4, a schematic diagram illustrating queue structure according to an embodiment of the present invention is shown. Queues are used to control the flow of messages, shown generally by 200, between manager 44 and SM 22. Queues are assigned a priority for servicing. In the illustrated example, the priorities include High Priority (HP) queue 202a, Medium Priority (MP) queues 204a-204d, and Low Priority (LP) queues 206a-206d and Status Queues 208a-208d. In one embodiment, Status Queues 208a-208d are serviced in place of MP Queues 204a-204d or LP Queues 206a-206d and are reserved for providing SM 22 with immediate resources in order to complete a current outstanding task. The Status Queue 208a-208d provides a way to move a message to the head of the corresponding MP Queue 204a-204d or LP Queue 206a-206d. Restrictions may be placed on Status Queue 208a-208d in order to not create a long series of messages. Additionally, SM 22 may be prohibited from assigning any message to Status Queue 208a-208d.

In the embodiment shown, CAS client 30 is serviced by HP Queue 202a, MP Queue 204a, LP Queue 206a, and Status Queue 208a. ASD client 32, DRM client 34, and SM bootloader 26 are serviced by MP Queue 204b-204d, respectively, LP Queue 206b-206d, respectively, and Status Queue 208b-208d, respectively. Other configurations are also possible within the spirit and scope of the present invention.

Figure 5:
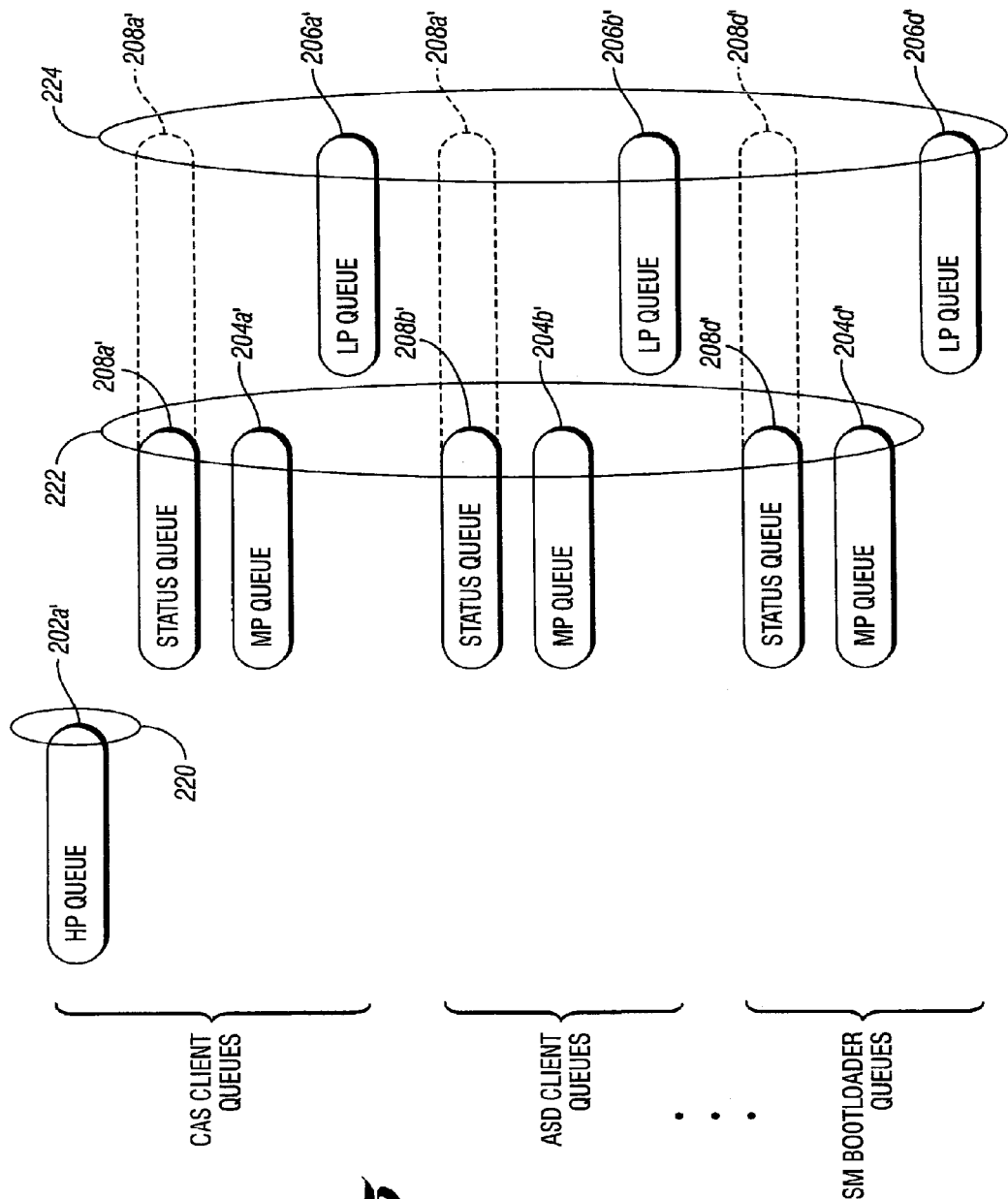
FIG. 5 is a schematic diagram illustrating queue selection according to an embodiment of the present invention.

Referring now as well to FIG. 5, a schematic diagram illustrating queue selection according to an embodiment of the present invention is shown. Queue structure and servicing 154 moves messages from queues according to a continual selection algorithm that examines the set of queues established by manager 44. This algorithm selects the next message to be dequeued and passed to SM 22 for processing. When all queues are empty, the selection process waits until a new message has been enqueued. The queue selection algorithm ensures that the queues are serviced with appropriate importance assigned to each message type. For example, conditional access systems today typically require real-time interaction with the content in order to decrypt the content and, as such, the CAS SM Client on the Secure Micro may be the only entity on SM 22 granted a high priority queue 202a.

The queue selection algorithm may be statically coded in manager 44 to service HP Queue 202a many more times, and prior to, the other queues which are initialized. The queue selection algorithm may be, for example, a hybrid round robin algorithm. For example, in high priority round 220, every message appearing first or at the head of HP Queue 202a' is processed until none remain. Alternatively, a set number of messages, such as twenty, may be processed by HP Queue 202a', a set amount of time may be used, or the like. Next, one message is processed in medium priority round 222, if any are pending, before returning to high priority round 220. In each medium priority round 222 for one embodiment of the present invention, MP Queues 204 are processed in a round robin fashion with corresponding Status Queues 208 substituting for MP Queues 204 if messages are present in the associated Status Queue 208. For example, if two status messages are queued in Status Queue 208a' and one message is queued in Status Queue 208b', the sequence might be 208a', 208b', 204c', 204d', . . . in the first round, then 208a', 204b', 204c', 204d', . . . in the second round, then 204a', 204b', 204c', 204d', . . . in the third round, etc. Alternatively, all status messages may be processed first. For example, if two status messages are queued in Status Queue 208a' and one message is queued in Status Queue 208b', the sequence might be 208a', 208b', 208a', 204a', 204b', 204c', 204d', . . . 204a', 204b', 204c', 204d', . . . etc. This may continue until no message remains in MP Queues 204, for a set number of messages, for a set number of rounds, for a set amount of time, and the like. If queue selection conditions are met for reaching low priority processing, one message is processed in low priority round 224 before returning to high priority round 220. In each low priority round 224 for one embodiment of the present invention, successive LP Queues 206 are processed in a round robin fashion with Status Queues 208 substituting for corresponding LP Queues 206 if messages are present in the associated Status Queue 208. As will be recognized by one of ordinary skill in the art, various schemes for processing messages in queues 202, 204, 206, 208 are within the spirit and scope of the present invention.

Referring again to FIG. 3, manager 44 may include yielding functionality 156. In order to ensure that messages enqueued into HP Queue 202 are serviced within the necessary time frame, SM 22 may be restricted in its processing for one or more SM clients 28 before "yielding" to other message handling duties. Alternatively, SM 22 may yield in the middle of a task if it needs to send additional response messages to host 24. When a message is yielded upon, that message is left at (or returned to) the head of the queue from which it was "dequeued" until the queue selection algorithm can service that message again. In one embodiment, SM 22 is allowed to yield on a message a specified number of times prior to the message being discarded. In another embodiment, messages in the HP Queue cannot be yielded upon if there is a short response time limit to meet specific cryptographic requirements. The decryption of content received by host 24 from the MSO head-end may be the highest priority for host 24. Yielding may also be used in conjunction with messages requesting resources from host 24 required to complete the processing of the message. The status of these resources may be communicated to SM 22 via the Status Queue.

Figure 6:
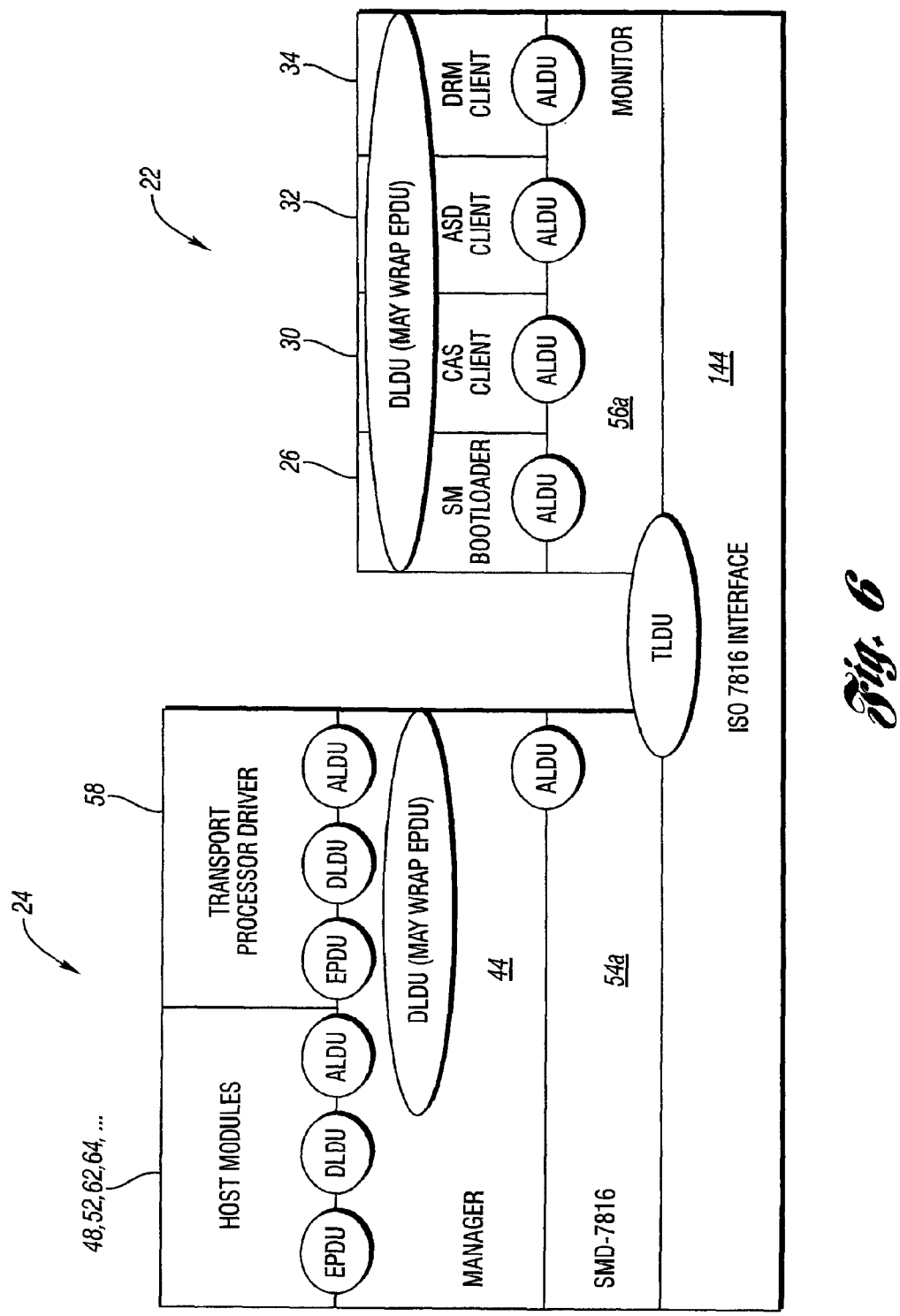
FIG. 6 is a block diagram illustrating message processing according to an embodiment of the present invention.

Referring again to FIG. 3, message format processing functionality 160 may also be provided. With reference as well to FIG. 6, a schematic diagram illustrating data units and interfaces according to an embodiment of the present invention is shown. Manager 44 and SM driver 54 may work with up to four layers of messaging: external payload data unit (EPDU), DCAS layer data unit (DLDU), adaptation layer data unit (ALDU), and transport layer data unit (TLDU) used with the 7816 physical layer.

EPDU defines an externally supported data unit that is received as opaque data from a connection. Manager 44 need have no inherent knowledge of the structure of an EPDU. The maximum size of an EPDU is typically 64 kilobytes.

DLDU defines a data construct that includes metadata to form the ALDU header and the payload. A DLDU can either be an EPDU to which an ALDU header will be added prior to its transfer using the SendOpaque or ReceiveOpaque messages. At this stage in the data flow, ALDU header metadata is available to add to the EPDU, and the DLDU Identifier is encoded into the metadata for the ALDU header. The remaining ALDU Header information is encoded at the ALDU layer. In one embodiment the maximum size of a DLDU is 64 Kbytes, with eight bytes reserved for the ALDU header.

ALDU defines a data construct in which each DLDU is broken into smaller units for further processing. A unit can consist of the EPDU payload or a defined DLDU. An ALDU construct cannot exceed a maximum size of 2048 bytes, including the required ALDU header for each ALDU exchanged with SM Messaging Entities 26, 30, 32, 34. The maximum size of an ALDU going to a handler and other defined Host Messaging Entities (e.g., 48, 52, 62, 64) is 64 Kbytes including the eight byte ALDU header. Manager 44 separately enqueues each ALDU for delivery to SM 22. Manager 44 also ensures that a single ALDU transfer is not interrupted by dequeuing another ALDU. At this stage in the data flow, the DLDU Identifier is replicated in each ALDU, and ALDU Header Construct information is encoded.

TLDU defines a transport layer unit for the ISO 7816 transport layer. Each TLDU is transferred across the SMD-7816 interface 144 using Read and Write Commands. The transport layer segments each ALDU into units of maximum 255 bytes for Write Commands or 256 bytes for Read Commands. There is no TLDU layer with the USB transport. Instead, USB signaling is used with ALDUs as the payload.

Manager 44 performs different functions on different types of data units. Since EPDUs are typically raw data, processing rules as configured by SM 22 may be applied to the EPDUs. The DLDU stage is EPDU data that has been formatted to be the payload for an ALDU. Other data, such as connection ID, consumer codes, producer codes, and the like, are known and carried with the DLDU. Once processing is complete on the DLDU, in order to be enqueued or otherwise sent according to the defined set of common DCAS messages, the DLDU is converted to an ALDU. The ALDU has a formally defined header construct. Once ALDU destined for SM 22 is formed, it is enqueued. At the SMD layer, in preparation for transfer across 7816 interface 144, the SM driver 54a breaks apart the ALDU into smaller physical pieces to meet the physical requirements for ISO 7816 to generate the TLDU layer. The smaller pieces are reassembled in monitor 56a.

Referring again to FIG. 3, messaging functionality 158 includes message filtering, parsing, and enqueuing. SM 22 may set up filtering for various messages on different connection types such as, for example, multicast and broadcast connections. Manager 44 provides a tool box to enable filtering for various messages as directed by SM client(s) 28 and SM bootloader 26 for each unique situation. Filtering is dynamically set up in hardware or software for PID filtering (Inband connections), IP filtering or UDP filtering (DSG connections). Filters can be applied to any type of transport technology, including multicast or broadcast. In one embodiment, the filtering mechanisms include a set of flags and matching characteristics as is known in the art. The matching of the message itself may be specified as a bit pattern that is configured in a ProcessingRuleSetRequest message. This message is used by hardware or software functions inside host 24 to find the messages specified by SM 22.

A wide variety of filtering tools are available. Current messages can be removed now, after the next match, or after a channel change. The message check sum can be examined. An ignore filter flag may be set. A filter starting state may be set or the filter state changed after a match or after a channel change. Duplicate messages can be removed. The next filter to be applied can be found after a match or after a channel change. Rules for parsing the message can be specified. The queue into which the message will be placed can be specified. Any of the filter tools may be reconfigured as often as needed by SM 22.

Figure 7:
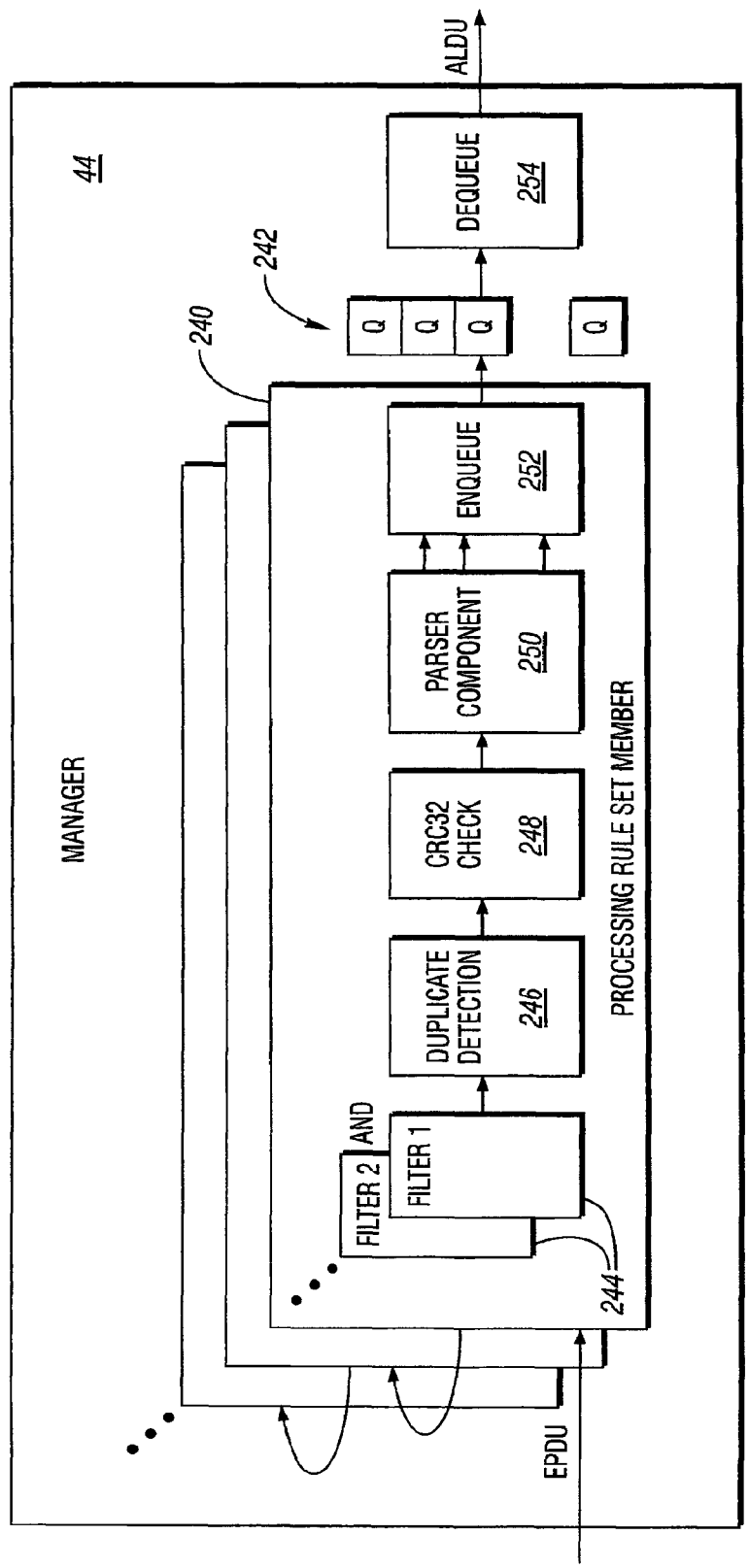
FIG. 7 is a schematic diagram illustrating data units and interfaces according to an embodiment of the present invention.

Referring as well to FIG. 7, a block diagram illustrating message processing according to an embodiment of the present invention is shown. Message processing configurable tools allow messages to come from any source and go to any source in a manner that makes efficient use of the resources of SM 22.

Manager 44 is capable of processing a plurality of parameter groups. Each parameter group is provided in a parameter group member, one of which is indicated by 240. Each parameter group member specifies one or more rules or operations that may be applied to an incoming packet if the packet meets optional search criteria. The result of these rules and operations is typically either the placing of a corresponding message into an available queue, shown generally by 242, or the discarding of the message.

In the exemplary rule set member 240, EPDU message may be first filtered by one or more filters 244. A variety of filtering operations may be used. For example, selected bits may be compared to a specified pattern. This may include examining information relating to source, destination, identification, type, size, state, parameter values, and the like. Multiple filtering operations may be implemented in an ANDing relationship, with ORing provided through multiple rule set members 240.

Duplicate detection 246 may be provided, with duplicate detected messages causing second and subsequent messages to be dropped, all duplicate messages to be dropped, duplicate counting, status message triggering, and the like. Unrecoverable error checking 248 may also be provided, with various options on error detection including dropping corrupted messages, counting corrupted messages, status message triggering, and the like. Messages that survive to this point may be parsed by parsing component 250. For example, EPDU messages may be reformatted as ALDU messages. Messages may then be placed into one or more of a plurality of queues by enqueue component 252 based on one or more of source, destination, priority, and the like. Dequeue component 254 uses a dequeuing algorithm to determine from which queue 242 the next output message will be sent.

Referring again to FIG. 3, manager 44 may include common message manager interface 162. Interface 162 includes tools available to configure host 24. The common messages are designed to meet the needs of various content protection systems. When manager 44 receives a configuration via a common message, manager 44 processes the message and acts according to defined requirements. The common messages provide a support system for understanding what has been downloaded on SM 22, communicating with SM 22 to initialize SM 22 with host 24, providing message wrappers to send and receive messages from within and outside host 24 to SM 22, connecting conversations between SM clients 28 and applications 48, 52, and the like. Common messages provide interoperability between any compliant TP 38, SM 22, client 28, host software stack, and the like, and provides a mechanism for supporting future clients for future services.

The common set of messages includes control, connection, data transfer, processing rules and security packages such as, for example, those defined in DCAS standards. These messages provide the basis for communication as the common kernel regardless of what access security system(s) are downloaded. Host 24 behaves in a consistent way for each system, adapting to each technology as configured by that content protection system. Content encryption and decryption are possible with any content protection as supported by the tools of SM 22 and TP 38 with common messaging provided by manager 44.

The common set of control messages includes messages for the initialization and operational processes related to managing the environment of host 24. For example, one of the possible messages directs SM 22 to set a timer in host 24 for waking up SM 22 to perform a specific task. The message may indicate a time period and can either be set for single operation or recurring operation.

Common messaging supports multiple simultaneous systems downloaded at the same time while still maintaining a clear demarcation of each content protection system within host 24. Configuration via the common set of messages enables different content protection systems to transition protection of content in different ways for different parts of host 24 and output from host 24 to other devices.

Manager 44 may include managed initialization component 164 for initiating a series of messages with SM 22 upon each boot-up. This series of messages provides a common set of mechanisms that are used to take SM 22 from start-up into steady state activity. Host 24 can handle multiple simultaneous streams of content and easily scales to support complex content systems that ingest multiple programs of content from multiple sources while possibly providing media center functionalities. The flexible environment can be configured on the fly at the customer premise. Host 24 remains in a managed known state throughout the process regardless of which content protection system(s) are downloaded.

In one embodiment, host 24 sends a starting sequence of messages to SM 22, which responds with information allowing host 24 to configure itself for one or more specified content protection systems. Then, each the SM client(s) 28 provide an appropriate set of configuration information to establish communication and process messaging for that system. The end result is that security services for the content protection system(s) all run within SM 22.

Common content security functions may be provided in defined transport processor 38. The initialization by each system downloaded on SM 22 configures TP 38 for appropriate open standards cryptographic functions. TP 38 handles the encryption and decryption of content as configured by each content protection system. The configuration is applied at initialization and can be re-configured on the fly in real-time as needed.

Manager 44 may include code download coordination functionality 166. Host 24 includes a coordination tool for understanding when various pieces of software are downloaded as well as knowing when a customer may be using premium services. Host 24 is enabled to download the various software components for various areas including host platform code, application code, SM client code, and the like. Platform code download may rely on standardized methods for the trigger and delivery of the code image. Extensions may be provided to minimize the impact to customers, maintain a controlled state, coordinate download components, and the like. Code component coordination reduces the risk of race conditions and unknown states within host 24. To minimize impact on customer experience, the MSO can choose to download at a deferred time that is optimal to host 24 such as, for example, when the customer is not in the middle of recording, enjoying a pay-per-view session, and the like.

For SM clients 28 downloaded to SM 22, the download may be first stored on host 24. Manager 44 may provide the SM client code image segmented into a data unit format for transfer to SM bootloader 26. Manager 44 reserves a data store for the purpose of holding the SM client(s) 28. This data store can also be used by SM 22 to store other data before being transferred to SM 22.

Host 24 provides an environment for downloading SM client(s) 28 and a partner handler application 48, 52. SM client 28 manages the cryptographic services for the content protection system. Handler 48, 52 manages the messaging with the MSO head-end to support any necessary configuration or communication for that system. Additionally, handler 48, 52 may take on additional functionality such as reporting and providing some management or configuration to host 24 for support of that system. The tool box in host 24 may support various configuration points for each type of content protection system. Thus, handler 48, 52 is not restricted in the types of communication it can use. Additionally, a DCAS-compliant host 24 provides mechanisms for a connection between handler 48, 52 and its partner SM client 28. This connection enables direct communication so that resources on host 24 can be used more efficiently by the content protection system(s).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    sending from a host a request to a secure processor requesting information about a plurality of content protection clients maintained by the secure processor;
    receiving, in response to the sent request, information identifying each of the plurality of content protection clients maintained by the secure processor;
    sending a message to one or more of the identified content protection clients;
    receiving message handling instructions from at least one of the identified content protection clients; and
    configuring message handling operations for the at least one identified content protection client based on the received message handling instructions, the message handling operations including parameters for selectively filtering received messages.

2. The method of claim 1 further comprising establishing at least one data connection for the at least one identified content protection client based on a connection identifier and a connection type specified in a message received from the at least one identified content protection client.

3. The method of claim 1 further comprising placing a received message into one of a plurality of queues assigned to the at least one identified content protection client based on the results of the selective filtering.

4. The method of claim 1 further comprising processing a duplicate received message based on the results of the selective filtering.

5. The method of claim 1 further comprising:
establishing a first set of message queues, at least one identified content protection client receiving messages from a member queue of the first set;
establishing a second set of message queues having a lower priority than the message queues in the first set of message queues, at least one identified content protection client receiving messages from a member queue of the second set;
establishing a status message queue for each of the at least one identified content protection clients; and
determining from which queue to send a next message based on a dequeuing algorithm that provides priority to the first set of message queues over the second set of message queues, wherein the status message queues are members of both the first set of message queues and the second set of message queues.

6. The method of claim 1 further comprising requesting the secure processor to yield execution in response to a message sent to the secure processor.

7. The method of claim 1 further comprising parsing a received message based on the results of the selective filtering.

8. The method of claim 1 further comprising:
receiving at the host downloaded code implementing at least one of the plurality of content protection clients;
segmenting the downloaded code into a plurality of messages;
sending the plurality of messages to the secure processor; and
sending a request to the secure processor requesting information about the at least one content protection client implemented by the downloaded code.

9. The method of claim 1 further comprising:
setting up a data connection with an external entity and reporting changes in the state of the data connection to the secure processor.

10. The method of claim 1 further comprising:
establishing a hierarchical set of message queues having at least three levels of priority;
receiving, for each identified content protection client, a message specifying queue configuration; and
assigning to each identified content protection client a queue from at least two of the at least three levels of priority based on the received message specifying queue configuration.

11. A system comprising:
one or more computers configured to:
send a request to a secure processor requesting information about a plurality of content protection clients maintained by the secure processor;
receive, in response to the sent request, information identifying each of the plurality of content protection clients maintained by the secure processor;
send a message to one or more of the identified content protection clients;
receive message handling instructions from at least one of the identified content protection clients; and
configure message handling operations for the at least one identified content protection client based on the received message handling instructions, the message handling operations including parameters for selectively filtering received messages.

12. The system of claim 11, wherein the one or more computers are further configured to establish at least one data connection for the at least one identified content protection client based on a connection identifier and a connection type specified in a message received from the at least one identified content protection client.

13. The system of claim 11, wherein the one or more computers are further configured to place a received message into one of a plurality of queues assigned to the at least one identified content protection client based on the results of the selective filtering.

14. The system of claim 11, wherein the one or more computers are further configured to process a duplicate received message based on the results of the selective filtering.

15. The system of claim 11, wherein the one or more computers are further configured to:
establish a first set of message queues, at least one identified content protection client receiving messages from a member queue of the first set;
establish a second set of message queues having a lower priority than the message queues in the first set of message queues, at least one identified content protection client receiving messages from a member queue of the second set;
establish a status message queue for each of the at least one identified content protection clients; and
determine from which queue to send a next message based on a dequeuing algorithm that provides priority to the first set of message queues over the second set of message queues, wherein the status message queues are members of both the first set of message queues and the second set of message queues.

16. The system of claim 11, wherein the one or more computers are further configured to request the secure processor to yield execution in response to a message sent to the secure processor.

17. The system of claim 11, wherein the one or more computers are further configured to parse a received message based on the results of the selective filtering.

18. The system of claim 11, wherein the one or more computers are further configured to:
receive downloaded code implementing at least one of the plurality of content protection clients;
segment the downloaded code into a plurality of messages;
send the plurality of messages to the secure processor; and
send a request to the secure processor requesting information about the at least one content protection client implemented by the downloaded code.

19. The system of claim 11, wherein the one or more computers are further configured to set up a data connection with an external entity and reporting changes in the state of the data connection to the secure processor.

20. The system of claim 11, wherein the one or more computers are further configured to:
establish a hierarchical set of message queues having at least three levels of priority;
receive, for each identified content protection client, a message specifying queue configuration; and
assign to each identified content protection client a queue from at least two of the at least three levels of priority based on the received message specifying queue configuration.

* * * * *